Figure 1:
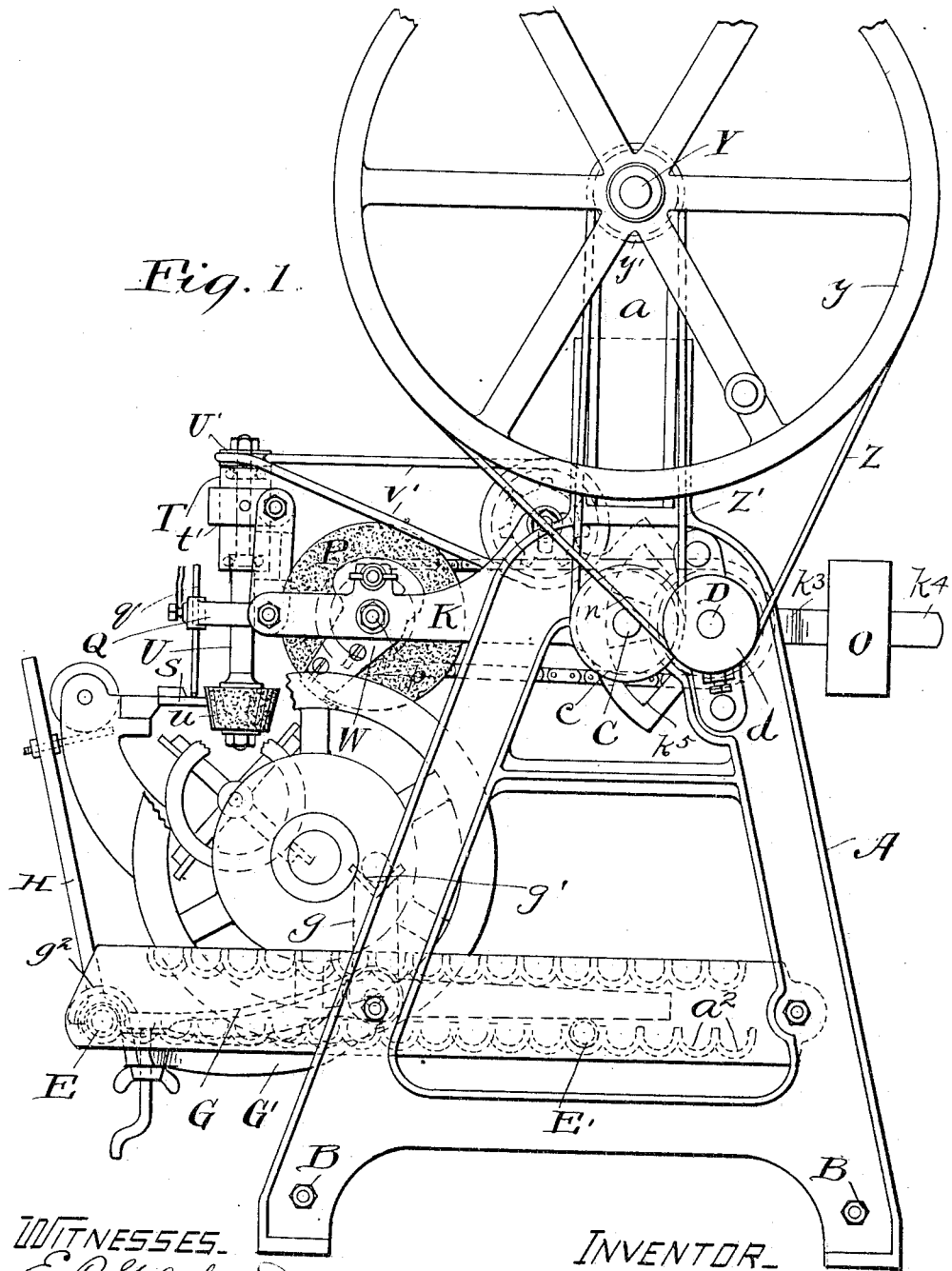

P. H. ROOT.
LAWN MOWER GRINDER.
APPLICATION FILED JULY 16, 1909.

950,560.

Patented Mar. 1, 1910.
3 SHEETS—SHEET 1.

WITNESSES
E. B. Gilchrist
H. R. Sullivan

INVENTOR
Percy H. Root
by Thurston & Woodward
attorneys

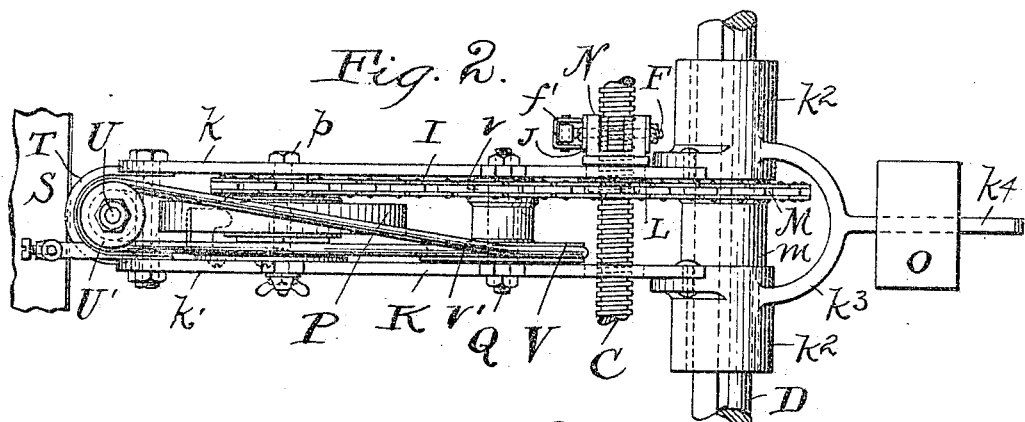
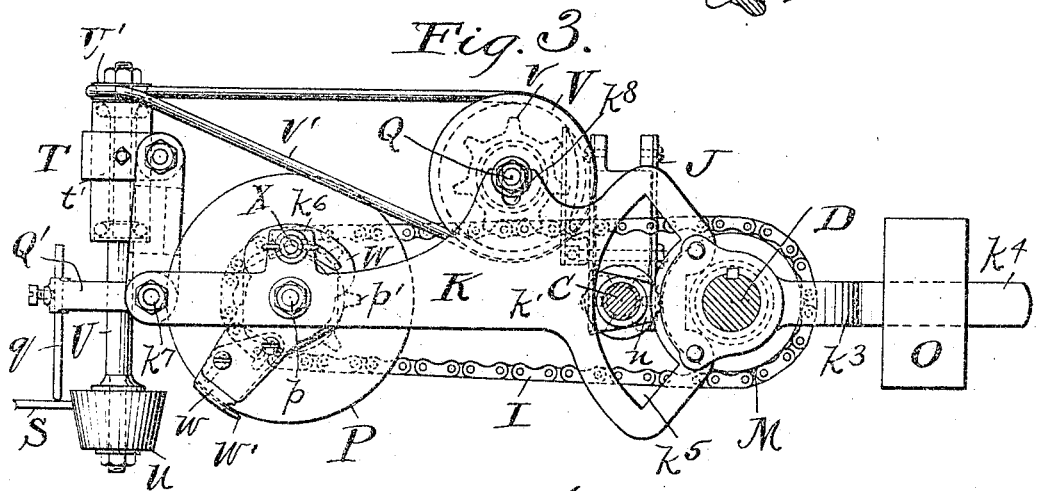
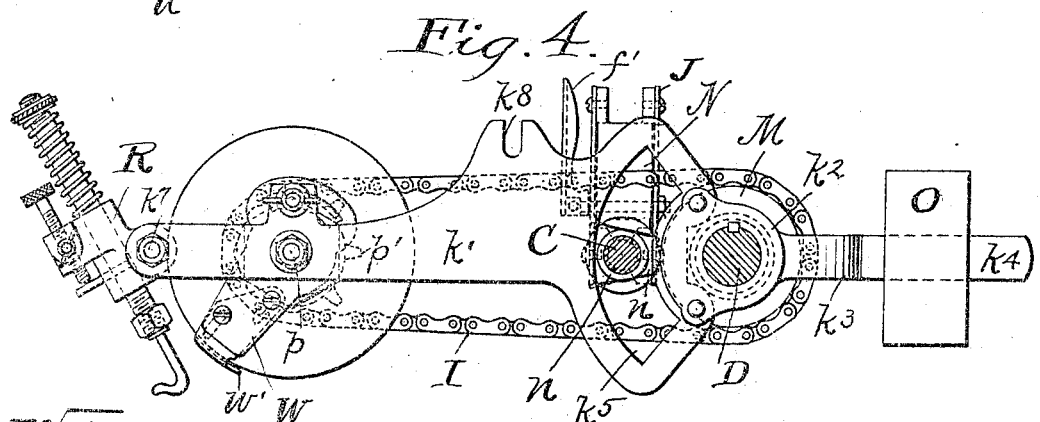

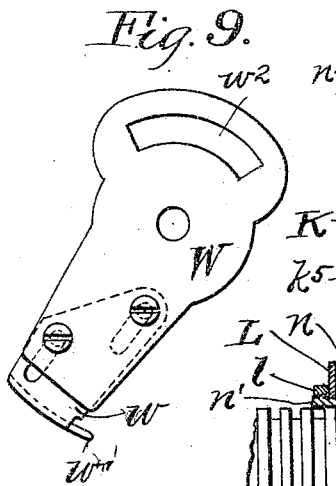
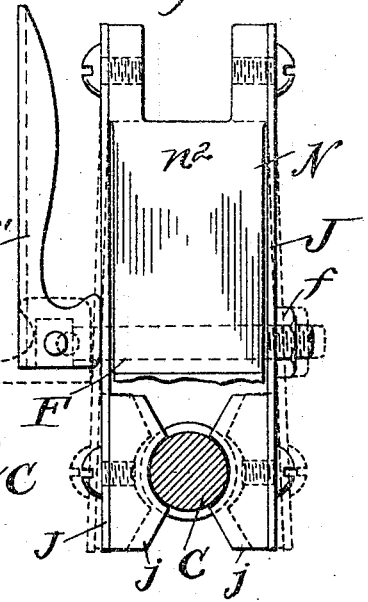
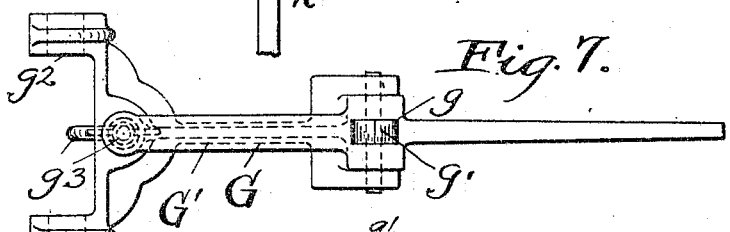
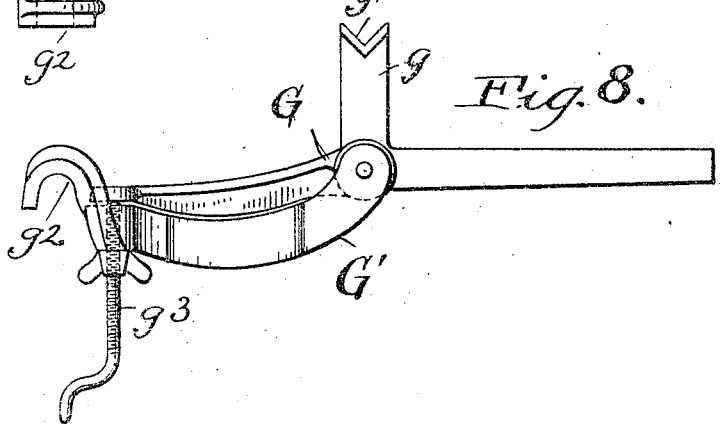

UNITED STATES PATENT OFFICE.

PERCY HUBERT ROOT, OF PLYMOUTH, OHIO.

LAWN-MOWER GRINDER.

950,560.

Specification of Letters Patent.

Patented Mar. 1, 1910.

Application filed July 16, 1909. Serial No. 507,889.

*To all whom it may concern:*

Be it known that I, PERCY HUBERT ROOT, a citizen of the United States, residing at Plymouth, in the county of Richland and State of Ohio, have invented a certain new and useful Improvement in Lawn-Mower Grinders, of which the following is a full, clear, and exact description.

This invention is an improvement upon the lawn mower grinder which forms the subject matter of my prior patent No. 908,142 issued on December 29, 1908.

The primary object of the invention is to adapt the machine for sharpening the straight knife as well as the curved knives of a lawn mower without taking the lawn mower out of the grinding machine.

The invention consists in the novel construction and combination of parts by which this end is attained and also to several practical improvements in the original machine, all of which will be hereinafter described and definitely pointed out in the claims.

In the drawing, Figure 1 is an end view of the improved machine with a lawn mower therein. Fig. 2 is a plan view of the arm K and parts associated with it. Fig. 3 is a side elevation of the same when the parts associated with said arm are those with which the straight knife of the lawn mower may be sharpened. Fig. 4 is a similar view when the arm carries only such mechanism as adapts the machine for grinding the spiral knives of the lawn mower. Fig. 5 is a rear view partly sectioned of the mechanism by which said arm is fed crosswise of the machine; and Fig. 6 is a right side view of a part of the same mechanism. Fig. 7 is a plan view and Fig. 8 is a side elevation of the adjustable means for supporting the lawn mower in the grinding machine. Fig. 9 is a detached view of the device for holding the curved blade of the lawn mower in proper relation to the grinding wheel.

The frame of the machine may be substantially like that shown in said prior patent, consisting mainly of two end frame members A, (of which only one is shown,) and tie rods B connecting them. The shaft D and the feed screw C are parallel and horizontal and rotatably mounted in the end frame members; and suitable means are provided by which they are rotated simultaneously at the proper relative rates. In the construction shown a shaft Y is mounted in an upward extension $a$ of one of the frame members; and to said shaft are attached two pulleys $y$, $y'$. A belt Z running over the pulley $y$ runs also over a pulley $d$ fixed to the shaft D. Another belt $Z'$ runs over the pulley $y'$ and over a pulley $c$ fixed to the feed screw. It will be understood, of course, that any suitable mechanism may be used instead of that shown for driving these two rotatable members C and D.

An arm K is hung loosely on the shaft D— that is to say, the two hubs $k^2$ of said arm loosely embrace said shaft, and they are connected behind the shaft by a curved bar $k^3$ having a rearward extension $k^4$ on which a counterbalance O is adjustably fixed. The arm in front of said hubs consists of two parallel members or bars $k$, $k'$. Near the front end of this arm is the grinding wheel P which is rotatable upon a shaft $p$ extending between and secured to said side bars $k$, $k'$. A sprocket wheel $p'$ is fixed to this grinding wheel. A sprocket wheel M embraces the shaft D, and the hub $m$ of this sprocket is substantially as long as the distance between the two hubs $k^2$ of the arm K, wherefore this sprocket wheel and arm must move endwise on the shaft together. The sprocket, however, has a tongue and groove connection with shaft D, by reason of which it and the shaft must rotate in unison irrespective of the position of the sprocket wheel lengthwise of said shaft. A sprocket chain I running over the sprocket wheels M and $p'$ drives the grinding wheel P.

The machine as thus far described is substantially like the machine shown in said prior patent. There are, however, certain differences in the construction and arrangement of the parts specified which increase the efficiency of the machine, and which are particularly adapted for use with the straight knife sharpening mechanism,—as will be presently described. The feed screw, however, in the machine shown in the drawing is in the same horizontal plane with shaft D. In both side bars $k$, $k'$ of the arm K is an arcual slot $k^5$, through which the feed screw passes freely. Loosely embracing and slidable upon this feed screw is a member N. On one side of this member the hub is externally in the shape of the segment of a ring, and this part $n$ of the hub passes through and fits freely in the arcual slot $k^5$ in the side bar $k$ of the arm K. A washer L embraces the hub and is held thereon by a nut $l$ and this washer L, and a part $n'$ of the member N prevent any relative movement lengthwise of the feed screw of said member N and the arm K. An arm $n^2$ of the member N has secured to it two springs J, to the ends of which half nuts $j$ are fixed in position to engage the feed screw. When permitted to so act, these springs swing outward so as to disengage these half nuts from the screw. A rod F passes through both of the springs, and has a nut $f$ on one end and a cam lever $f'$ on the other end. By swinging this cam lever to the position shown in full lines in Fig. 6 the springs are drawn together and the nuts $j$ caused to engage with the feed screw. When they do so engage then when the feed screw and shaft B are turned, the arm K and the grinding wheel, which it carries, will be caused to slowly travel crosswise of the machine and the grinding wheel is simultaneously turned. If the spiral knife of a lawn mower be properly held against the grinding wheel by suitable means, as for example that shown for the purpose in said prior patent, said knife will be sharpened.

The lawn mower to be sharpened is supported in the machine by having its spacing bar seated at the notched upper ends of the arms $g$; and by being supported also by a support H. An arm W loosely embraces the shaft $p$. It has a plate $w$ adjustably fixed to it, and the plate has a finger $w'$ adapted to engage the rear side of the spiral knife of a lawn mower and hold it against the grinding wheel. This arm W has an arcual slot $w^2$ for the reception of a lock bolt X, which goes through it and also through a lug $k^6$ on one of the side members of the arm K,—this mechanism permitting proper adjustment of said arm W so that its finger $w'$ may engage the spiral knives and hold them against the grinding wheel.

The lawn mower supporting mechanism shown is especially contrived with reference to its adaptability for use in a machine such as is shown in which the spiral knives and straight knife can be sharpened without removing the lawn mower from the machine. Two rods E E are supported in any of the inverted sockets $a^2$ on the end frame members A just as in the prior machine. Two mower supports are employed. They are alike and each consists of two levers G G' which are pivoted together. The rear end of the lever G rests on the rear rod E'. An arm $g$ extends upward from this lever and has a notch $g'$ in its upper end for receiving the spacing bar of a lawn mower. A lever G' has a hook $g^2$ on its front end for engagement with the front rod E. A screw $g^3$ going through lever G' furnishes a support for the front end of the lever G. By screwing this screw upward, the notched arm $g$ will be raised and will also be swung rearward. After the spiral knives are sharpened this screw is turned in the reverse direction, thereby lowering arm $g$ and moving its upper end forward. By this adjustment the lawn mower may be moved to the position in which its straight knife may be sharpened.

For grinding the spiral knives of the mower, a block R and accessories as shown in Fig. 4 hereof, are placed between the front ends of the side members $k$, $k'$ of the arm K, and secured therein by a bolt $k^7$. But where the straight knife is to be sharpened this block is removed and the block T is placed between said arms $k$, $k'$ and then secured by bolt $k^7$. A clamping collar $t$ is secured in the forked upper end of block T. This collar embraces and adjustably holds a sleeve $t'$ in which the vertical grinder shaft U is rotatably mounted. A conical grinding wheel $u$ is fixed to the lower end of this shaft, and a grooved pulley U' is fixed to its upper end.

A shaft Q, on which is a rotatable grooved pulley V and a sprocket wheel $v$, is let into the notches $k^8$ in the upper edges of the two side bars $k$, $k'$, and there secured. The sprocket wheel $v$ will engage the sprocket chain I and thereby it and the pulley V will be turned. A quarter turned belt $v'$ transmits motion from pulley V to pulley U'. An arm Q' fixed to arm $k'$ has in its end a vertically adjustable pin $q$, which engages with and slides upon the straight knife S and thereby holds the grinder in the proper position relative to said knife.

Having described my invention, I claim:

1. In a lawn mower grinder, the combination of a horizontal driving shaft, a horizontal feed screw, and mechanism for turning them with a substantially horizontal arm hung on and movable along said driving shaft, a substantially vertical grinder shaft supported by the front end of said arm, mechanism transmitting motion from said driving shaft to said vertical shaft, and means intermediate of said arm and said feed screw for moving said arm along said shaft.

2. In a lawn mower grinder, the combination of a driving shaft, an arm hung on said shaft and movable lengthwise thereof, a block adjustably secured to the front end of said arm, a vertical bearing sleeve adjustably secured to said block, a grinder shaft rotatably mounted in said sleeve and having a grinding wheel fixed to it, mechanism for moving said arm along said shaft, and mechanism transmitting motion from said driving shaft to the vertical grinder shaft while the arm is so moving.

3. In a lawn mower grinder, the combination of a driving shaft, an arm hung on and movable lengthwise of said shaft, said arm having a bifurcated front end, a block adjustably secured between the front ends of said arm, a clamp collar adjustably secured to the upper end of said block, a bearing sleeve adjustably clamped in said collar, a shaft rotatably mounted in said sleeve, a grinding wheel fixed to said shaft, and mechanism intermediate of the driving shaft and grinder shaft for turning the latter.

4. In a lawn mower grinder, the combination of a driving shaft, a bifurcated arm hung upon and movable lengthwise of said shaft, a sprocket wheel on the driving shaft having a driving engagement therewith and movable lengthwise of the shaft in unison with said arm, a grinding wheel rotatably mounted between the side members of said arm, a sprocket wheel fixed to said grinding wheel, a sprocket chain running over the two sprocket wheels mentioned, a substantially vertical bearing sleeve adjustably fixed to the front end of said arm, a grinder shaft rotatably mounted therein, a sheave fixed to said shaft, a shaft removably secured to the side members of said arm, a pulley and connected sprocket rotatable upon said shaft with the sprocket wheel in engagement with the sprocket chain mentioned, and a belt running over said two pulleys.

5. In a lawn mower grinder, the combination of a driving shaft, a feed screw, mechanism for turning them, an arm hung upon and movable lengthwise of the driving shaft and having in front of said shaft an arcual slot through which the feed screw passes, a member movably mounted on the feed screw having a portion of its hub projected into said arcual slot, means carried by said member for compelling said arm to move with it lengthwise of the feed screw, two springs fixed to said member, nut sections fixed to said springs, and means for causing said nuts to engage and disengage the feed screw.

6. In a lawn mower grinder, the combination of a grinding wheel and means for simultaneously rotating it and moving it in an axial direction, two bars adjustably fixed to the machine frame, a lever resting at its rear end on one of said bars and having an upwardly extended notched arm, a lever pivoted to the first named lever and having a hook on its front end for engagement with the other bar, and a screw carried by one of said levers and engaging the other for the purpose of adjusting their relative positions.

7. In a lawn mower grinder, a lawn mower support comprising two levers, one of which is pivoted near its end to the other about midway between the ends of the latter, said latter lever having between its ends an upwardly extended arm, and the former lever having at its front end a hook, and a screw screwing through the first named lever and engaging the under side of the front end of the other lever.

In testimony whereof, I hereunto affix my signature in the presence of two witnesses.

PERCY HUBERT ROOT.

Witnesses:
L. R. McGRUDER,
E. K. TRAUGER.